(12) United States Patent
Li (10) Patent No.: US 12,408,150 B2
(45) Date of Patent: Sep. 2, 2025

(54) METHOD, TERMINAL AND READABLE STORAGE MEDIUM FOR TRANSMITTING FEEDBACK SEQUENCE

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 397 days.

(21) Appl. No.: 17/775,224

(22) PCT Filed: Nov. 6, 2019

(86) PCT No.: PCT/CN2019/116056
§ 371 (c)(1),
(2) Date: May 6, 2022

(87) PCT Pub. No.: WO2021/087820
PCT Pub. Date: May 14, 2021

(65) Prior Publication Data
US 2022/0400473 A1    Dec. 15, 2022

(51) Int. Cl.
*H04W 72/04*    (2023.01)
*H04W 64/00*    (2009.01)
(Continued)

(52) U.S. Cl.
CPC ....... *H04W 72/044* (2013.01); *H04W 64/006* (2013.01); *H04W 72/20* (2023.01)

(58) Field of Classification Search
CPC .............. H04L 1/1861; H04W 64/006; H04W 72/044; H04W 72/20
See application file for complete search history.

(56) References Cited

U.S. PATENT DOCUMENTS

| | | | | |
|---|---|---|---|---|
| 2014/0321406 | A1* | 10/2014 | Marinier | H04B 7/024 370/329 |
| 2014/0369290 | A1* | 12/2014 | Yang | H04L 1/0073 370/329 |

(Continued)

FOREIGN PATENT DOCUMENTS

| | | |
|---|---|---|
| CN | 101854670 A | 10/2010 |
| CN | 104080170 A | 10/2014 |

(Continued)

OTHER PUBLICATIONS

International Search Report of PCT/CN2019/116056 dated Jul. 14, 2020 with English translation, (4p).

(Continued)

*Primary Examiner* — Mansour Oveissi
(74) *Attorney, Agent, or Firm* — Arch & Lake LLP (57) ABSTRACT

The present disclosure relates to the field of communication, and provided therein are a feedback sequence transmission method. The method comprises: determining, by a receiving terminal, a physical-resource location adopted by a feedback terminal when the feedback terminal sends the feedback sequence, based on a feedback characteristic of the feedback terminal; and receiving, by the receiving terminal, the feedback sequence at the physical-resource location corresponding to the feedback terminal.

18 Claims, 8 Drawing Sheets

---

Determining a physical-resource location used by the feedback terminal when the feedback terminal sends the feedback sequence — 301

Receiving the feedback sequence at the physical-resource location corresponding to the feedback terminal — 302

(51) Int. Cl.
*H04W 72/044* (2023.01)
*H04W 72/20* (2023.01)

(56) References Cited

U.S. PATENT DOCUMENTS

| | | | | |
|---|---|---|---|---|
| 2015/0282197 A1* | 10/2015 | Lee | ................ | H04L 5/0035 |
| | | | | 370/329 |
| 2019/0182801 A1* | 6/2019 | Chen | ................ | H04W 76/11 |
| 2019/0222985 A1 | 7/2019 | Nguyen et al. | | |
| 2019/0261356 A1* | 8/2019 | Myung | ................ | H04W 48/12 |
| 2020/0059917 A1 | 2/2020 | Feng | | |
| 2022/0085925 A1* | 3/2022 | Gao | ................ | H04W 72/0446 |
| 2022/0200742 A1* | 6/2022 | Li | ................ | H04W 72/51 |

FOREIGN PATENT DOCUMENTS

| CN | 104602270 A | 5/2015 |
|---|---|---|
| CN | 106411475 A | 2/2017 |
| CN | 107710853 A | 2/2018 |
| CN | 107872300 A | 4/2018 |
| CN | 108075864 A | 5/2018 |
| CN | 108631968 A | 10/2018 |
| WO | 2017166073 A1 | 10/2017 |
| WO | 2019027287 A1 | 2/2019 |

OTHER PUBLICATIONS

CNOA issued in Application No. 201980002927.X dated Mar. 30, 2023 with English translation, (9p).
CATT, CATR, "Analysis on V2V message size," 3GPP TSG RAN WG2 Meeting #91bis R2-154262, Malmö, Sweden, Oct. 5-9, 2015, (5p).
The First CNOA issued in Application No. 201980002927.X, dated Oct. 26, 2922, with English translation, (17p).

* cited by examiner

METHOD, TERMINAL AND READABLE STORAGE MEDIUM FOR TRANSMITTING FEEDBACK SEQUENCE

CROSS REFERENCE TO RELATED APPLICATION

The present disclosure is a U.S. National Stage of International Application No. PCT/CN2019/116056, filed on Nov. 6, 2019, and the entire content of the Application is incorporated herein by reference for all purposes.

TECHNICAL FIELD

The present disclosure relates to the field of communications, and in particular to a method, terminal and readable storage medium for transmitting a feedback sequence.

BACKGROUND

Vehicle wireless communication technology (Vehicle to Everything, V2X) is a new generation of information communication technology that connects a vehicle with everything, wherein V represents the vehicle, X represents any object that has information interaction with the vehicle, and currently X mainly includes vehicles, pedestrians, traffic-roadside infrastructures and networks. Information modes of V2X interaction include: interactions of Vehicle to Vehicle (V2V), Vehicle to Infrastructure (V2I), Vehicle to Pedestrian (V2P), and Vehicle to Network (V2N).

In the fifth generation mobile communication technology (5th-Generation, 5G), a plurality of feedback terminals send feedback sequences on the same one or the same two symbols, and probability of collision is relatively large.

SUMMARY

Examples of the present disclosure provide a method, terminal and readable storage medium for transmitting a feedback sequence, which may be used to solve the problem of high probability of collision when a plurality of feedback terminals send the feedback sequences on the same one or the same two symbols.

On one hand, a method for transmitting a feedback sequence is provided, and the method includes:
  determining, by a receiving terminal, a physical-resource location used by a feedback terminal when the feedback terminal sends the feedback sequence, based on a feedback characteristic of the feedback terminal; and
  receiving, by a receiving terminal, the feedback sequence at the physical-resource location corresponding to the feedback terminal.

On the other hand, there is provided a receiving terminal, and the terminal includes:
  a processor; and
  a transceiver connected to the processor,
  wherein the processor is configured to load and execute executable instructions to realize the method for transmitting a feedback sequence as described in the above examples of the present disclosure.

On the other hand, there is provided a computer-readable storage medium, storing at least one instruction, at least one instruction, at least one piece of program, one code set or one instruction set, and the at least one instruction, the at least one piece of program, the code set or the instruction set is loaded and executed by a processor to realize the method for transmitting a feedback sequence as described in the above examples of the present disclosure.

BRIEF DESCRIPTION OF THE DRAWINGS

In order to illustrate examples of the present disclosure more clearly, accompanying drawings that need to be used in the description of the examples will be briefly introduced below. Apparently, the accompanying drawings in the following descriptions are only some examples of the present disclosure, and for those of ordinary skill in the art, other drawings can be obtained according to these drawings without paying out any creative effort.

DETAILED DESCRIPTION

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
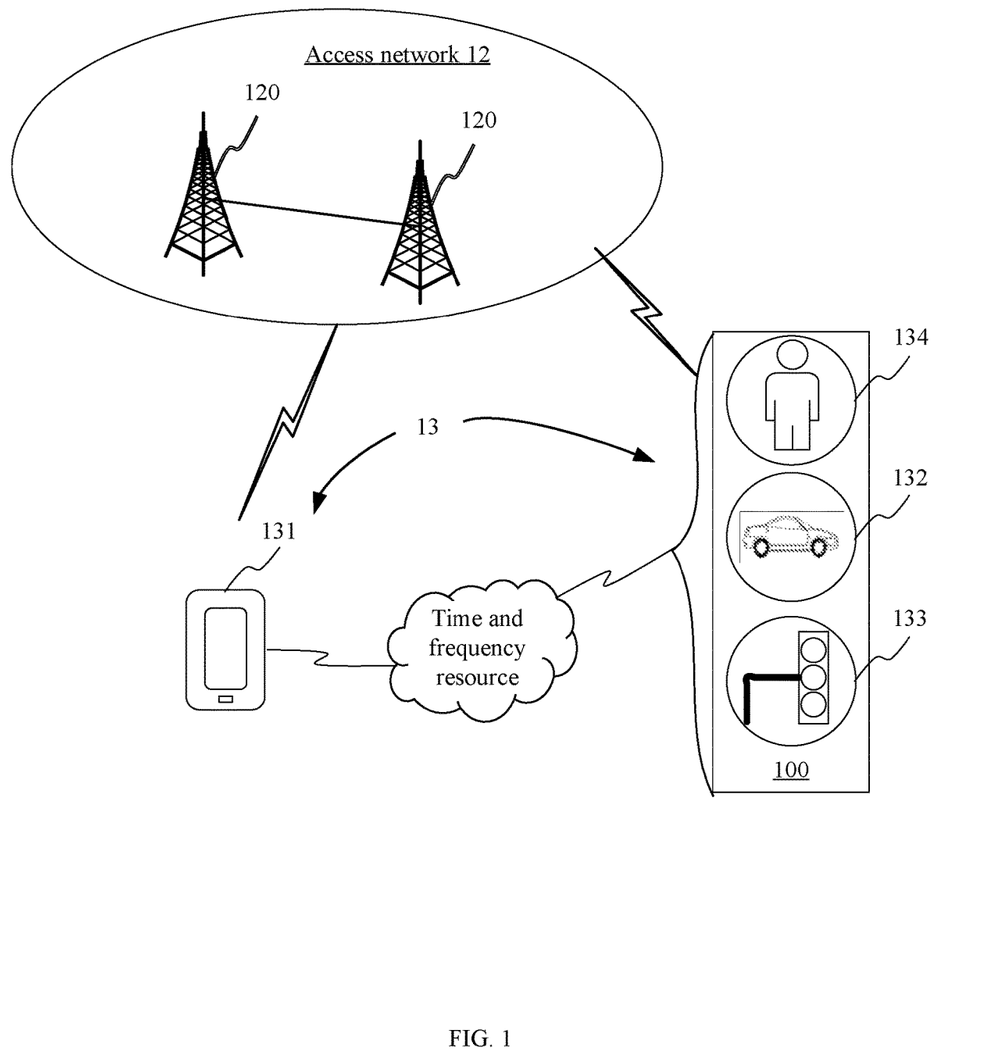
FIG. 1 is a block diagram that shows a communication system supporting direct-connected communication provided by one or more examples of the present disclosure.

FIG. 1 is a block diagram that shows a communication system supporting direct-connected communication provided by an exemplary embodiment of the present disclosure, and the communication system may include: an access network 12 and terminals 13.

The access network 12 includes several access-network devices 120. The access-network device 120 may be a base station, and the base station is a device deployed in an access network to provide wireless-communication function for a terminal. The base station may include various forms of macro base station, micro base station, relay station, access point, and so on. In systems using different radio-access technologies, names of devices with base-station function may be different, for example, in the Long Term Evolution (LTE) system, they are called eNodeB or eNB, and in the 5G New Radio (NR) system, they are called gNodeB or gNB. With evolution of communication technology, description of the name "base station" may change. For convenience of description, in the embodiments of the present disclosure, the above-mentioned apparatuses for providing a wireless-communication function for a terminal are collectively referred to as access-network equipment.

The terminal 13 may include various handheld devices, vehicle-mounted devices, wearable devices, computing devices or other processing devices connected to wireless modems, as well as various forms of user terminals (User Equipment, UE), mobile stations (MS), terminal devices (terminal device), and so on, with wireless-communication function. For convenience of description, the devices mentioned above are collectively referred to as terminals. The access-network device 120 and the terminal 13 communicate with each other through a certain air-interface technology, such as a Uu interface.

Vehicle wireless communication technology (Vehicle to Everything, V2X) is a new generation of information communication technology that connects a vehicle with everything, wherein V represents the vehicle, X represents any object that has information interaction with the vehicle, and currently X mainly includes vehicles, pedestrians, traffic-roadside infrastructures and networks.

In the embodiment of the present disclosure, the terminal 13 may include a vehicle 131, other vehicles 132, infrastructure 133, and pedestrians 134.

Vehicle to Vehicle (V2V) refers to communication between the vehicle 131 and the other vehicle 132, the vehicle of this side sends relevant information of this side to the vehicle of the other side, and the relevant information includes driving speed, geographic location, driving direction and driving status, etc.

Vehicle to Infrastructure (V2I) refers to communication between the vehicle 131 and the infrastructure 133, and the infrastructure 133 includes all infrastructure encountered by the vehicle during driving, including building facilities such as traffic lights, bus stops, buildings, tunnels, etc.

Vehicle to Pedestrian (V2P) refers to communication between the vehicle 131 and the pedestrian 134. Pedestrian generally refers to an electronic device with mobile-communication capability carried by the pedestrian, such as a mobile phone or a wearable device, wherein the wearable device may include a smart bracelet, a smart watch, and a smart ring, etc.

In the example of the present disclosure, it is illustrated by an example that the vehicle 131 is referred to as a first terminal, and the other vehicle 132, the infrastructure 133 and the pedestrian 134 are referred to as a second terminal, but the two terminals can interchange roles, which is not limited.

Optionally, the above-mentioned communication system may be an NR system and a subsequent-evolution system.

In the NR system, uplink control information (UCI) is control information sent from UE to the base station, carried on a physical uplink control channel (PUCCH) or a physical uplink share channel (PUSCH). Wherein, the UCI contains response information to downlink data (Hybrid Automatic Repeat request Acknowledge character, HARQ-ACK), which is used to feed back to the base station whether received downlink data has been in a state of correct reception, including acknowledgement response (Acknowledge character, ACK) and negative acknowledgement (NACK), wherein the acknowledgement response is used to indicate that the UE has correctly received the downlink data, and the NACK is used to indicate that the UE has not correctly received the downlink data.

Optionally, a NR uplink control channel supports five formats, wherein PUCCH format 0 carries 1 to 2 bits of UCI information, and during transmission, occupies all 12 sub-carriers of 1 resource block (RB) in frequency domain, and occupies 1 to 2 orthogonal frequency division multiplexing (OFDM) symbols in time domain. The PUCCH format 0 carries UCI information by means of sequence selection, that is, carries n bits of UCI information through $2^n$ candidate sequences.

Figure 2:
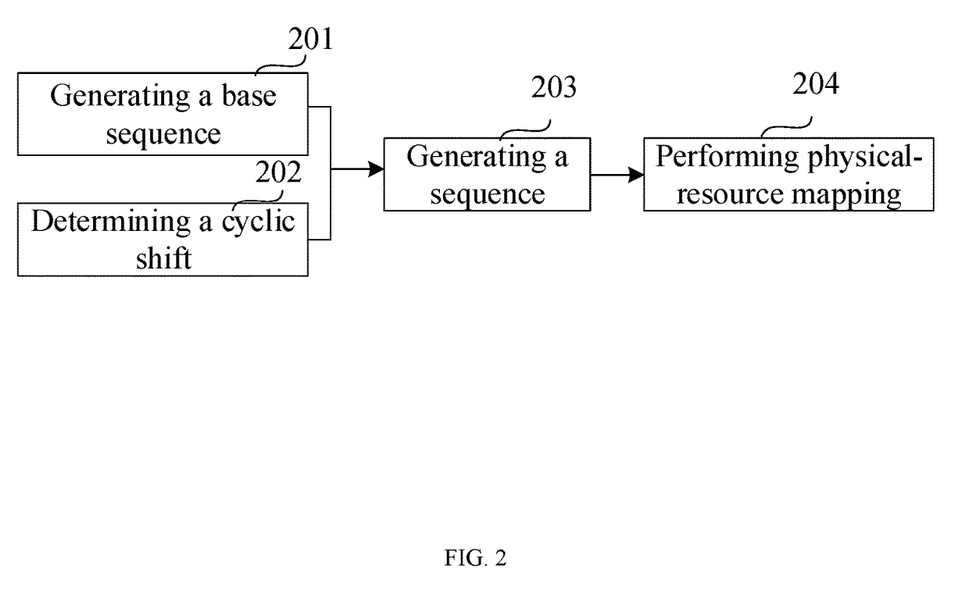
FIG. 2 is a schematic diagram that shows a process for determining UCI information provided by one or more examples of the present disclosure.

Optionally, carrying UCI information by means of sequence selection can ensure single-carrier characteristic during uplink information transmission, thereby reducing peak to average power ratio (PAPR) and improving coverage of the PUCCH format 0. Please refer to FIG. 2 for a process for determining the UCI information. As shown in FIG. 2, first, there are step 201, generating a base sequence; and step 202, determining a cyclic shift. After step 203, generating a sequence to be sent, according to the base sequence and the cyclic shift, it is step 204, performing physical-resource mapping on the sequence to be sent.

In the NR system, in order to improve resource-utilization efficiency, the $2^n$ candidate sequences are generated based on different values of the cyclic shifts of a computer-generated sequence with a length of 12, and different cyclic shifts of the computer-generated sequence are orthogonal. That is, different UEs select the cyclic shifts to be sent from the $2^n$ candidate sequences according to the UCI information to be transmitted, and multiplex the same one RB. The base station detects the sequences sent by the UEs from the candidate sequences, so as to determine the UCI sent by the UEs.

Optionally, a formula for generating a sequence of above-mentioned PUCCH format 0 is as follows:

$$x(lgN_{sc}^{RB} + n) = r_{u,v}^{(\alpha,\delta)}(n)$$

$$n = 0, 1, \ldots N_{sc}^{RB} - 1$$

$$l = \begin{cases} 0, & \text{one } OFDM \text{ simbol of } PUCCH \\ 0, 1 & \text{one } OFDM \text{ simbols of } PUCCH \end{cases},$$

wherein, l is an index of OFDM symbol corresponding to the UCI, n is an index of subcarrier occupied by the OFDM symbol occupied by the UCI, $N_{sc}^{RB}$ is a number of the subcarriers, 12, that is, the PUCCH format 0 occupies 12 subcarriers of one RB in frequency domain, $r_{u,v}^{(\alpha,\delta)}(n)$ is the sequence, and the sequence is calculated as follows:

$$r_{u,v}^{(\alpha,\delta)}(n) = e^{j\alpha n} \bar{r}_{u,v}(n), \ 0 \leq n < M_{ZC},$$

wherein $\alpha$ in the $r_{u,v}^{(\alpha,\delta)}(n)$ is used to represent the cyclic shifts of sequences of different users, a calculation manner of $\alpha$ is:

$$\alpha_l = \frac{2\pi}{N_{sc}^{RB}}\left((m_0 + m_{cs} + n_{cs}(n_{s,f}^\mu, l + l'))\mathrm{mod}N_{sc}^{RB}\right),$$

$n_{cs}$ is the index of subcarrier occupied by the occupied OFDM symbol, l' is an offset value, $n_{cs}$ is an index after offsetting, the $\alpha$ is collectively determined by an initial cyclic shift $m_0$ of PUCCH resource and a specific cyclic shift $m_{cs}$ of HARQ-ACK, and for 1-bit HARQ-ACK, value selection of $m_{cs}$ is shown as in Table 1 below:

TABLE 1

| Value of HARQ-ACK | 0 | 1 |
|---|---|---|
| Parameters of Cyclic Shift of Sequence | $m_{cs} = 0$ | $m_{cs} = 6$ |

For 2 bits HARQ-ACK, value selection of $m_{cs}$ is shown as in Table 2 below:

TABLE 2

| Value of HARQ-ACK | {0, 0} | {0, 1} | {1, 1} | {1, 0} |
|---|---|---|---|---|
| Parameters of Cyclic Shift of Sequence | $m_{cs} = 0$ | $m_{cs} = 3$ | $m_{cs} = 6$ | $m_{cs} = 9$ |

In a NR V2X system in the related art, when HARQ-ACK is fed back, a physical sidelink feedback channel (PSFCH) is designed to carry the feedback ACK or NACK information. However, there is no power-control mechanism in the V2X system, then, when receiving powers that the UCI fed back by a plurality of feedback terminals arrives at a receiving terminal are different, the sequences with lower receiving power may be overwhelmed by the sequences with higher receiving power, which makes it impossible to interpret feedback sequences with lower receiving power. Moreover, since all the feedback terminals feed back sequence information on the same one or the same two symbols, probability of collision is high for the V2X system.

Figure 3:
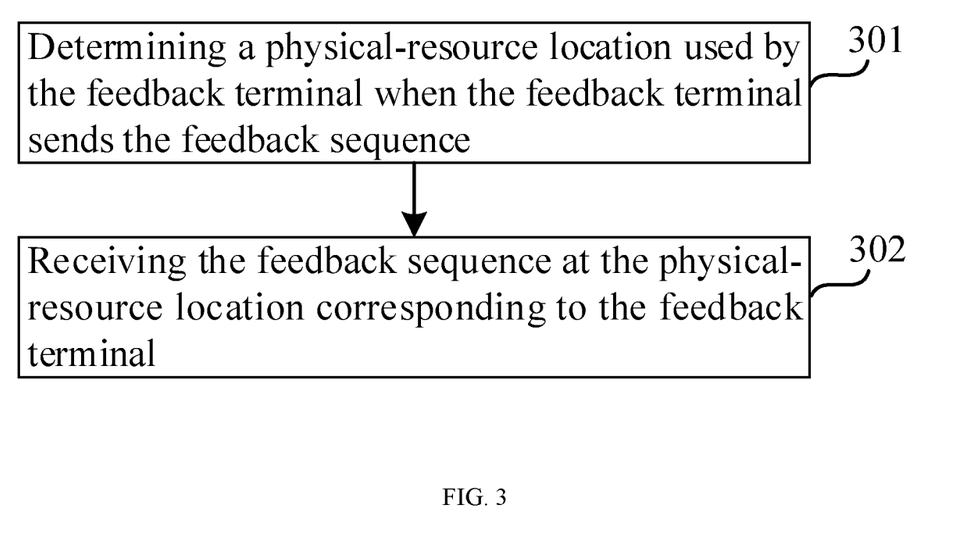
FIG. 3 is a flowchart of a method for transmitting a feedback sequence provided by one or more examples of the present disclosure.

FIG. 3 is a flowchart of a method for transmitting a feedback sequence provided by an example of the present disclosure. It is illustrated by an example that the method is applied to a receiving terminal for receiving a feedback sequence. As shown in FIG. 3, the method includes:

In step 301, a physical-resource location used by a feedback terminal when the feedback terminal sends the feedback sequence is determined, based on a feedback characteristic of the feedback terminal.

Optionally, the physical-resource location includes a time-domain-resource location and a frequency-domain-resource location.

Optionally, the feedback characteristic includes at least one of a distance characteristic between the receiving terminal and the feedback terminal, and a byte characteristic of the feedback sequence when the feedback terminal sends the feedback sequence.

Optionally, when determining the physical-resource location, at least one of the following manners is included:

First, according to distance information between the receiving terminal and the feedback terminal, the physical-resource location used by the feedback terminal when the feedback terminal sends the feedback sequence is determined, and the physical-resource locations shared by the feedback terminals in different distance ranges when the feedback terminals send the feedback sequences are different. That is, the time-domain-resource positions and the frequency-domain-resource positions shared by the feedback terminals in different distance ranges when the feedback terminals send the feedback sequences are different.

Optionally, when the receiving terminal divides the feedback terminals according to distances, it arranges the UEs (terminals) that are equidistant from the receiving terminal, or the UEs whose distances from the receiving terminal are within a certain range, into one group. That is, the UEs within a certain radius range of a circle whose center is the receiving terminal, are UEs of the same one group, and receiving powers of the feedback sequences sent by the UEs of the same one group when the feedback sequences sent by the UEs of the same one group arrive at the receiving UE, are equivalent.

Illustratively, UEs whose distances from the receiving UE are within a range of 10 meters are one group, and UEs whose distances from the receiving UE are more than 10 meters and less than 50 meters are another group.

Optionally, the receiving terminal may configure the physical-resource location used by the feedback terminal when the feedback terminal sends the feedback sequence, by sending configuration information to the feedback terminal, or, the receiving terminal may determine the physical-resource location used by the feedback terminal when the feedback terminal sends the feedback sequence, according to information configured by an access-network device, and the two manners are illustrated respectively:

1. After the receiving terminal determines the distance information between the receiving terminal and the feedback terminal, it sends first configuration signaling to the feedback terminal according to the distance information, and the first configuration signaling includes an information field for indicating physical-resource information that the feedback terminal sends the feedback sequence.

Optionally, the feedback terminal, according to the information field in the first configuration signaling, determines the physical-resource location used when sending the feedback sequence.

2. The receiving terminal and the feedback terminal respectively receive second configuration signaling sent by the access-network device, and the second configuration signaling includes an information field for indicating a corresponding relationship between the distance ranges and the physical-resource locations. When the feedback terminal sends the feedback sequence, it sends at the corresponding physical-resource location according to the distance information between the feedback terminal and the receiving terminal. When the receiving terminal receives the feedback sequence, it receives at the corresponding physical-resource location according to the distance information between the feedback terminal and the receiving terminal.

Second, according to a number of bytes of the feedback sequence fed back by the feedback terminal, the physical-resource location used by the feedback terminal when the feedback terminal sends the feedback sequence is determined, and the physical-resource locations corresponding to feedback sequences with different numbers of bytes are different.

Optionally, when the receiving terminal divides the feedback terminals according to the numbers of bytes, the UEs that send feedback sequences with the same number of bytes are arranged into one group.

Illustratively, those whose feedback sequence is 1 bit are arranged into one group, and those whose feedback sequence is 2 bits are arranged into another one group.

Optionally, the receiving terminal may configure the physical-resource location used by the feedback terminal when the feedback terminal sends the feedback sequence, by sending configuration information to the feedback terminal, or, the receiving terminal may determine the physical-resource location used by the feedback terminal when the feedback terminal sends the feedback sequence, according to information configured by an access-network device, and the two manners are illustrated respectively:

1. After the receiving terminal determines a number of bytes of the feedback sequence sent by the feedback terminal, it sends third configuration signaling to the feedback terminal according to the number of bytes, and the third configuration signaling includes an information field for indicating physical-resource information that the feedback terminal sends the feedback sequence.

Optionally, the feedback terminal, according to the information field in the third configuration signaling, determines the physical-resource location used when sending the feedback sequence.

2. The receiving terminal and the feedback terminal respectively receive fourth configuration signaling sent by the access-network device, and the fourth configuration signaling includes an information field for indicating a corresponding relationship between the numbers of bytes of the feedback sequences and the physical-resource locations. When the feedback terminal sends the feedback sequence, it sends at the corresponding physical-resource location according to the number of bytes of the feedback sequence. When the receiving terminal receives the feedback sequence, it receives at the corresponding physical-resource location according to the number of bytes of the feedback sequence.

In step 302, the feedback sequence is received at the physical-resource location corresponding to the feedback terminal.

Optionally, corresponding initial cyclic shifts m0 when the feedback terminals in different groups send the feedback sequences are different.

Optionally, the above-mentioned initial cyclic shift m0 may be selected by the feedback terminal itself, or may be configured by the receiving terminal to the feedback terminal, and the two manners will be illustrated respectively:

First, the receiving terminal sends fifth configuration signaling to the feedback terminal, and the fifth configuration signaling includes an information field for indicating the initial cyclic shift.

Second, the feedback terminal selects m0 by itself, and sends notification signaling to the receiving terminal, and the notification signaling is used to indicate the initial cyclic shift m0 correspondingly selected by the feedback terminal.

Optionally, when the initial cyclic shift m0 does not conflict with initial cyclic shifts of other feedback terminals, the initial cyclic shift m0 is recorded; and sixth configuration signaling is sent to the feedback terminal, when the initial cyclic shift m0 conflicts with initial cyclic shifts fed back by other feedback terminals, wherein the sixth configuration signaling includes an information field for indicating an adjusted initial cyclic shift.

To sum up, the method for transmitting a feedback sequence provided in the example, by grouping the feedback terminals, and sharing different physical-resource information when sending the feedback sequences for different groups, allocates the physical-resource information when the feedback terminals send the feedback sequences, so as to avoid the problem of collision because the feedback terminals share the same one or the same two symbols when a plurality of feedback terminals send the feedback sequences.

Figure 4:
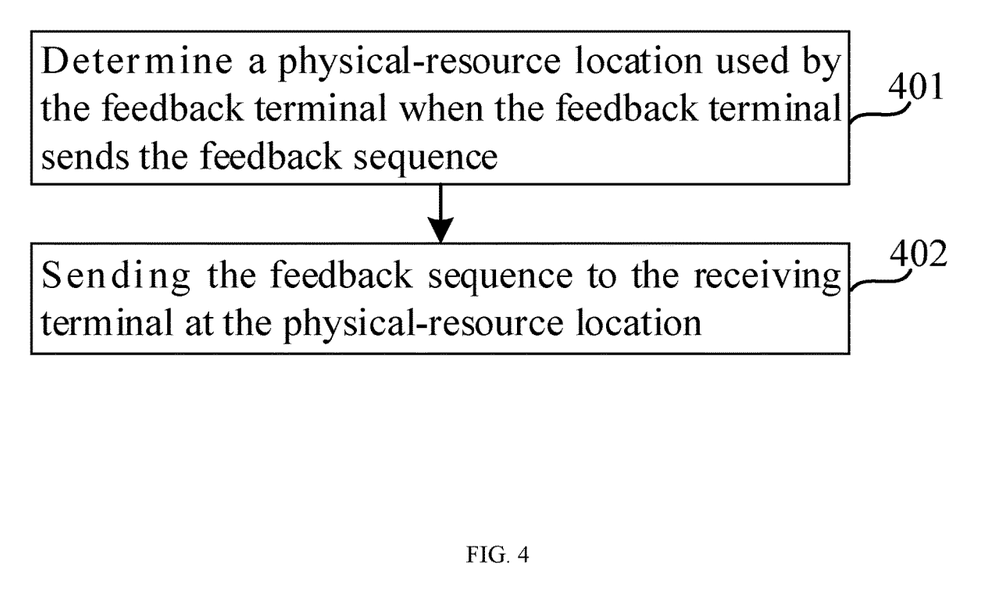
FIG. 4 is a flowchart of a method for transmitting a feedback sequence provided by one or more examples of the present disclosure.

FIG. 4 is a flowchart of a method for transmitting a feedback sequence provided by an example of the present disclosure. It is illustrated by an example that the method is applied to a feedback terminal for sending a feedback sequence. As shown in FIG. 4, the method includes:

In step 401, according to a feedback characteristic of the feedback terminal, a physical-resource location used by the feedback terminal when the feedback terminal sends the feedback sequence is determined.

Optionally, the physical-resource location includes a time-domain-resource location and a frequency-domain-resource location.

Optionally, the feedback characteristic includes at least one of a distance characteristic between the receiving terminal and the feedback terminal, and a byte characteristic of the feedback sequence when the feedback terminal sends the feedback sequence.

Optionally, when determining the physical-resource location, at least one of the following manners is included:

First, according to distance information between the receiving terminal and the feedback terminal, the physical-resource location used by the feedback terminal when the feedback terminal sends the feedback sequence is determined, and the physical-resource locations shared by the feedback terminals in different distance ranges when the feedback terminals send the feedback sequences are different. That is, the time-domain-resource positions and the frequency-domain-resource positions shared by the feedback terminals in different distance ranges when the feedback terminals send the feedback sequences are different.

Optionally, the receiving terminal may configure the physical-resource location used by the feedback terminal when the feedback terminal sends the feedback sequence, by sending configuration information to the feedback terminal, or, the receiving terminal may determine the physical-resource location used by the feedback terminal when the feedback terminal sends the feedback sequence, according to information configured by an access-network device, and the two manners are illustrated respectively:

1. After the receiving terminal determines the distance information between the receiving terminal and the feedback terminal, it sends first configuration signaling to the feedback terminal according to the distance information, and the first configuration signaling includes an information field for indicating physical-resource information that the feedback terminal sends the feedback sequence.

Optionally, the feedback terminal, according to the information field in the first configuration signaling, determines the physical-resource location used when sending the feedback sequence.

2. The receiving terminal and the feedback terminal respectively receive second configuration signaling sent by the access-network device, and the second configuration signaling includes an information field for indicating a corresponding relationship between the distance ranges and the physical-resource locations. When the feedback terminal sends the feedback sequence, it sends at the corresponding physical-resource location according to the distance information between the feedback terminal and the receiving terminal. When the receiving terminal receives the feedback sequence, it receives at the corresponding physical-resource location according to the distance information between the feedback terminal and the receiving terminal.

Second, according to a number of bytes of the feedback sequence fed back by the feedback terminal, the physical-resource location used by the feedback terminal when the feedback terminal sends the feedback sequence is determined, and the physical-resource locations corresponding to feedback sequences with different numbers of bytes are different.

Optionally, the receiving terminal may configure the physical-resource location used by the feedback terminal when the feedback terminal sends the feedback sequence, by sending configuration information to the feedback terminal, or, the receiving terminal may determine the physical-resource location used by the feedback terminal when the feedback terminal sends the feedback sequence, according to information configured by an access-network device, and the two manners are illustrated respectively:

1. After the receiving terminal determines a number of bytes of the feedback sequence sent by the feedback terminal, it sends third configuration signaling to the feedback terminal according to the number of bytes, and the third configuration signaling includes an information field for indicating physical-resource information that the feedback terminal sends the feedback sequence.

Optionally, the feedback terminal, according to the information field in the third configuration signaling, determines the physical-resource location used when sending the feedback sequence.

2. The receiving terminal and the feedback terminal respectively receive fourth configuration signaling sent by the access-network device, and the fourth configuration signaling includes an information field for indicating a corresponding relationship between the numbers of bytes of the feedback sequences and the physical-resource locations. When the feedback terminal sends the feedback sequence, it sends at the corresponding physical-resource location according to the number of bytes of the feedback sequence. When the receiving terminal receives the feedback sequence, it receives at the corresponding physical-resource location according to the number of bytes of the feedback sequence In step 402, the feedback sequence is sent to the receiving terminal at the physical-resource location.

Optionally, corresponding initial cyclic shifts m0 when the feedback terminals in different groups send the feedback sequences are different.

Optionally, the above-mentioned initial cyclic shift m0 may be selected by the feedback terminal itself, or may be configured by the receiving terminal to the feedback terminal, and the two manners will be illustrated respectively:

First, the receiving terminal sends fifth configuration signaling to the feedback terminal, and the fifth configuration signaling includes an information field for indicating the initial cyclic shift.

Second, the feedback terminal selects m0 by itself, and sends notification signaling to the receiving terminal, and the notification signaling is used to indicate the initial cyclic shift m0 correspondingly selected by the feedback terminal.

Optionally, when the initial cyclic shift m0 does not conflict with the initial cyclic shifts of other feedback terminals, the initial cyclic shift m0 is recorded; and sixth configuration signaling is sent to the feedback terminal, when the initial cyclic shift m0 conflicts with the initial cyclic shifts fed back by other feedback terminals, wherein the sixth configuration signaling includes an information field for indicating an adjusted initial cyclic shift.

To sum up, the method for transmitting a feedback sequence provided in the example, by grouping the feedback terminals, and sharing different physical-resource information when sending the feedback sequences for different groups, allocates the physical-resource information when the feedback terminals send the feedback sequences, so as to avoid the problem of collision because the feedback terminals share the same one or the same two symbols when a plurality of feedback terminals send the feedback sequences.

Figure 5:
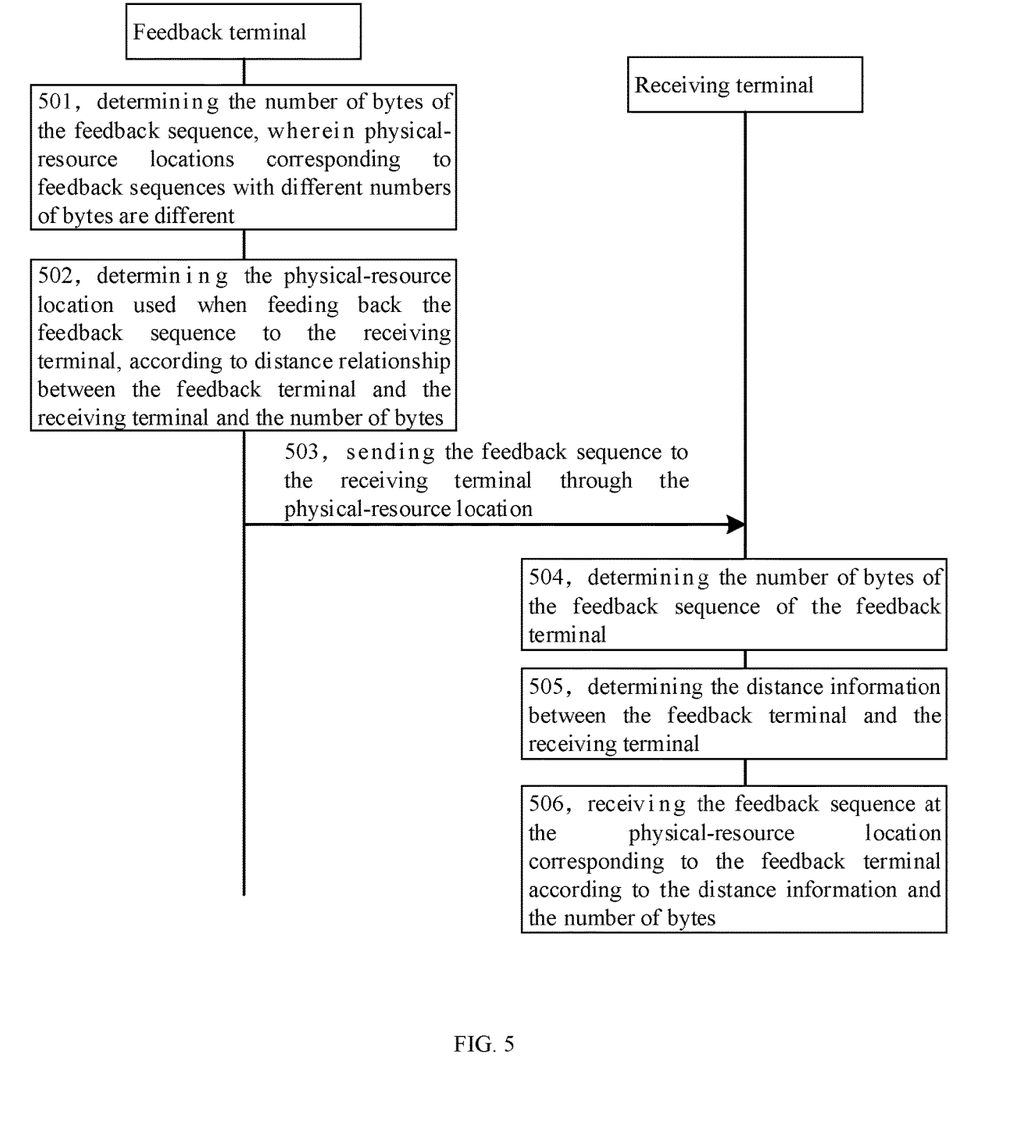
FIG. 5 is a flowchart of a method for transmitting a feedback sequence provided by one or more examples of the present disclosure.

In an optional example, when the feedback terminals are grouped, the feedback terminals need to be grouped by distance information and a number of bytes of the feedback sequence. FIG. 5 is a flowchart of a method for transmitting a feedback sequence provided by another example of the present disclosure, and it is illustrated by an example that the method is applied to a feedback terminal and a receiving terminal. As shown in FIG. 5, the method includes:

In step 501, the feedback terminal determines the number of bytes of the feedback sequence, and physical-resource locations corresponding to feedback sequences with different numbers of bytes are different.

In step 502, the feedback terminal determines the physical-resource location used when feeding back the feedback sequence to the receiving terminal, according to distance relationship (information) between the feedback terminal and the receiving terminal and the number of bytes.

Optionally, the physical-resource location is determined according to the number of bytes of the feedback sequence sent by the feedback terminal and the distance relationship (information).

Optionally, when determining the physical-resource location, at least one of the following manners is included:

1. After the receiving terminal determines the distance information between the receiving terminal and the feedback terminal and the number of bytes of the feedback sequence of the feedback terminal, it sends configuration signaling to the feedback terminal according to the distance information and the number of bytes, and the feedback terminal receives the configuration signaling, and the configuration signaling includes an information field for indicating physical-resource information that the feedback terminal sends the feedback sequence.

Optionally, the feedback terminal, according to the information field in the configuration signaling, determines the physical-resource location used when sending the feedback sequence.

2. The receiving terminal and the feedback terminal respectively receive second configuration signaling sent by the access-network device, and the second configuration signaling includes an information field for indicating a corresponding relationship between the distance ranges and the number of bytes and the physical-resource locations. When the feedback terminal sends the feedback sequence, it sends at the corresponding physical-resource location according to the distance information between the feedback terminal and the receiving terminal and the number of bytes. When the receiving terminal receives the feedback sequence, it receives at the corresponding physical-resource location according to the distance information between the feedback terminal and the receiving terminal and the number of bytes.

In step 503, the feedback sequence is sent to the receiving terminal through the physical-resource location.

In step 504, the receiving terminal determines the number of bytes of the feedback sequence of the feedback terminal.

In step 505, the receiving terminal determines the distance information between the feedback terminal and the receiving terminal.

In step 506, the receiving terminal receives the feedback sequence at the physical-resource location corresponding to the feedback terminal according to the distance information and the number of bytes.

To sum up, the method for transmitting a feedback sequence provided in the example groups the feedback terminals according to the distance information between the receiving terminal and the feedback terminal and the number of bytes, and shares different physical-resource information when sending the feedback sequences for different groups, so as to allocate the physical-resource information when the feedback terminals send the feedback sequences, to avoid the problem of collision because the feedback terminals share the same one or the same two symbols when a plurality of feedback terminals send the feedback sequences.

The method for transmitting a feedback sequence provided in the example groups the feedback terminals according to the distance information between the receiving terminal and the feedback terminal and the number of bytes occupied by the feedback sequence sent by the feedback terminal, and shares different physical-resource information when sending the feedback sequences for different groups, so as to allocate the physical-resource information when the feedback terminals send the feedback sequences, to avoid the problem of collision because the feedback terminals share the same one or the same two symbols when a plurality of feedback terminals send the feedback sequences.

Figure 6:
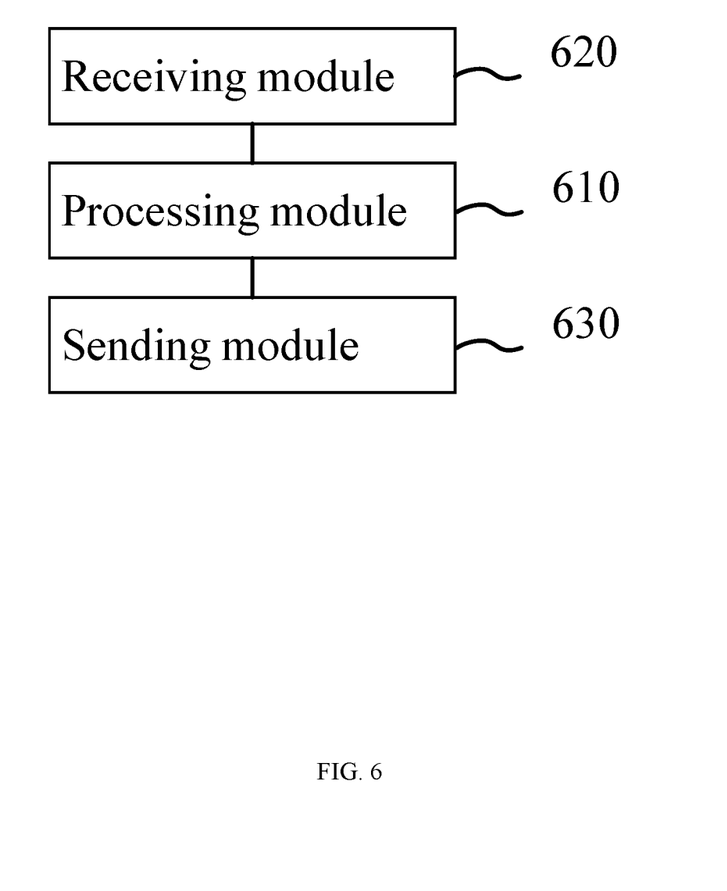
FIG. 6 is a structural block diagram of an apparatus for transmitting a feedback sequence provided by one or more examples of the present disclosure.

FIG. 6 is a structural block diagram of an apparatus for transmitting a feedback sequence provided by an example of the present disclosure, and it is illustrated by an example that the apparatus is applied in a receiving terminal. As shown in FIG. 6, the apparatus includes: a processing module 610 and a receiving module 620.

The processing module 610 is configured to determine a physical-resource location used by the feedback terminal when the feedback terminal sends the feedback sequence, based on a feedback characteristic of the feedback terminal.

The receiving module 620 is configured to receive the feedback sequence at the physical-resource location corresponding to the feedback terminal.

In an optional example, the processing module 610 is further configured to, according to distance information between the receiving terminal and the feedback terminal, determine the physical-resource location used by the feedback terminal when the feedback terminal sends the feedback sequence, and the physical-resource locations shared by the feedback terminals in different distance ranges when the feedback terminals send the feedback sequences are different.

In an optional example, the apparatus further includes:
a sending module 630, configured to send first configuration signaling to the feedback terminal according to the distance information, wherein the first configuration signaling includes an information field for indicating physical-resource information that the feedback terminal sends the feedback sequence.

In an optional example, the receiving module 620 is further configured to receive second configuration signaling sent by an access-network device, and the second configuration signaling includes an information field for indicating a corresponding relationship between the distance ranges and the physical-resource locations.

In an optional example, the processing module 610 is further configured to, according to a number of bytes of the feedback sequence fed back by the feedback terminal, determine the physical-resource location used by the feedback terminal when the feedback terminal sends the feedback sequence, and the physical-resource locations corresponding to feedback sequences with different numbers of bytes are different.

In an optional example, the apparatus further includes:
a sending module 630, configured to send third configuration signaling to the feedback terminal according to the number of bytes, wherein the third configuration signaling includes an information field for indicating physical-resource information that the feedback terminal sends the feedback sequence.

In an optional example, the receiving module 620 is further configured to receive fourth configuration signaling sent by the access-network device, and the fourth configuration signaling includes an information field for indicating a corresponding relationship between the numbers of bytes of the feedback sequences and the physical-resource locations.

In an optional example, the apparatus further includes:
a sending module 630, configured to send fifth configuration signaling to the feedback terminal, wherein the fifth configuration signaling includes an information field for indicating an initial cyclic shift.

In an optional example, the receiving module 620 is further configured to receive notification signaling sent by the feedback terminal, and the notification signaling is used to indicate the initial cyclic shift correspondingly selected by the feedback terminal.

In an optional example, the apparatus further includes:
a sending module 630, configured to, send sixth configuration signaling to the feedback terminal, when the initial cyclic shift conflicts with initial cyclic shifts fed back by other feedback terminals, wherein the sixth configuration signaling includes an information field for indicating an adjusted initial cyclic shift.

Figure 7:
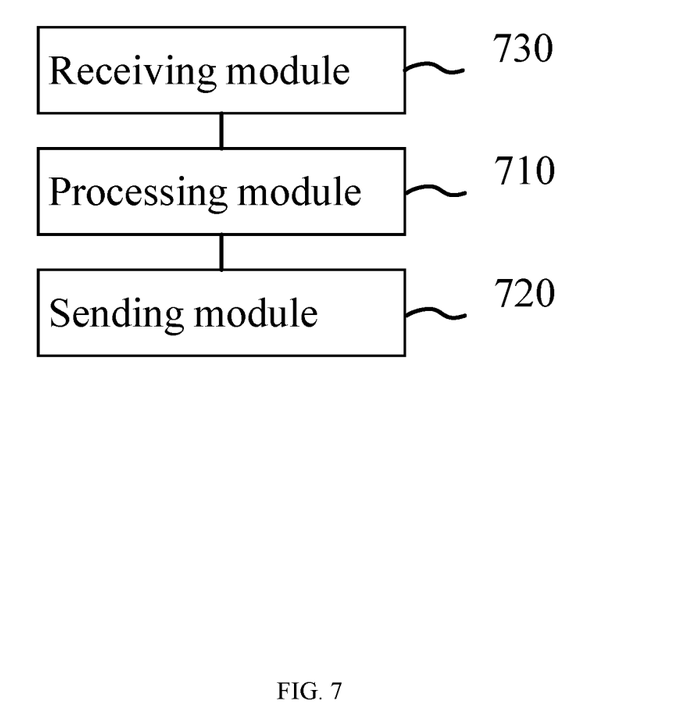
FIG. 7 is a structural block diagram of an apparatus for transmitting a feedback sequence provided by one or more examples of the present disclosure.

FIG. 7 is a structural block diagram of an apparatus for transmitting a feedback sequence provided by an example of the present disclosure, and it is illustrated by an example that the apparatus is applied in a feedback terminal. As shown in FIG. 7, the apparatus includes: a processing module 710 and a sending module 720.

The processing module 710 is configured to, according to a feedback characteristic, determine a physical-resource location used by the feedback terminal when the feedback terminal sends the feedback sequence.

The sending module 720 is configured to send the feedback sequence to the receiving terminal at the physical-resource location.

In an optional example, the processing module 710 is further configured to, according to distance information between the receiving terminal and the feedback terminal, determine the physical-resource location used by the feedback terminal when the feedback terminal sends the feedback sequence, and the physical-resource locations corresponding to different distance ranges are different.

In an optional example, the apparatus further includes:

a receiving module 730, configured to receive first configuration signaling sent by the receiving terminal, wherein the first configuration signaling includes an information field for indicating physical-resource information that the feedback terminal sends the feedback sequence, and the first configuration signaling is generated by the receiving terminal according to the distance information.

In an optional example, the apparatus further includes:

a receiving module 730, configured to receive second configuration signaling sent by an access-network device, wherein the second configuration signaling includes an information field for indicating a corresponding relationship between the distance ranges and the physical-resource locations.

In an optional example, the processing module 710 is further configured to, according to a number of bytes of the feedback sequence, determine the physical-resource location used by the feedback terminal when the feedback terminal sends the feedback sequence, and the physical-resource locations corresponding to feedback sequences with different numbers of bytes are different.

In an optional example, the apparatus further includes:

a receiving module 730, configured to receive third configuration signaling sent by the receiving terminal, wherein the third configuration signaling includes an information field for indicating physical-resource information that the feedback terminal sends the feedback sequence.

In an optional example, the apparatus further includes:

a receiving module 730, configured to receive fourth configuration signaling sent by the access-network device, wherein the fourth configuration signaling includes an information field for indicating a corresponding relationship between the numbers of bytes of the feedback sequences and the physical-resource locations.

In an optional example, the apparatus further includes:

a receiving module 730, configured to receive fifth configuration signaling sent by the receiving terminal, wherein the fifth configuration signaling includes an information field for indicating an initial cyclic shift.

In an optional example, the sending module 720 is further configured to send notification signaling to the receiving terminal, and the notification signaling is used to indicate the initial cyclic shift correspondingly selected by the feedback terminal.

In an optional example, the apparatus further includes:

a receiving module 730, configured to receive sixth configuration signaling sent by the receiving terminal, wherein the sixth configuration signaling includes an information field for indicating an adjusted initial cyclic shift.

To sum up, the apparatus for transmitting a feedback sequence provided in the example groups the feedback terminals according to the distance information between the receiving terminal and the feedback terminal, and shares different physical-resource information when sending the feedback sequences for different groups, so as to allocate the physical-resource information when the feedback terminals send the feedback sequences, to avoid the problem of collision because the feedback terminals share the same one or the same two symbols when a plurality of feedback terminals send the feedback sequences.

Figure 8:
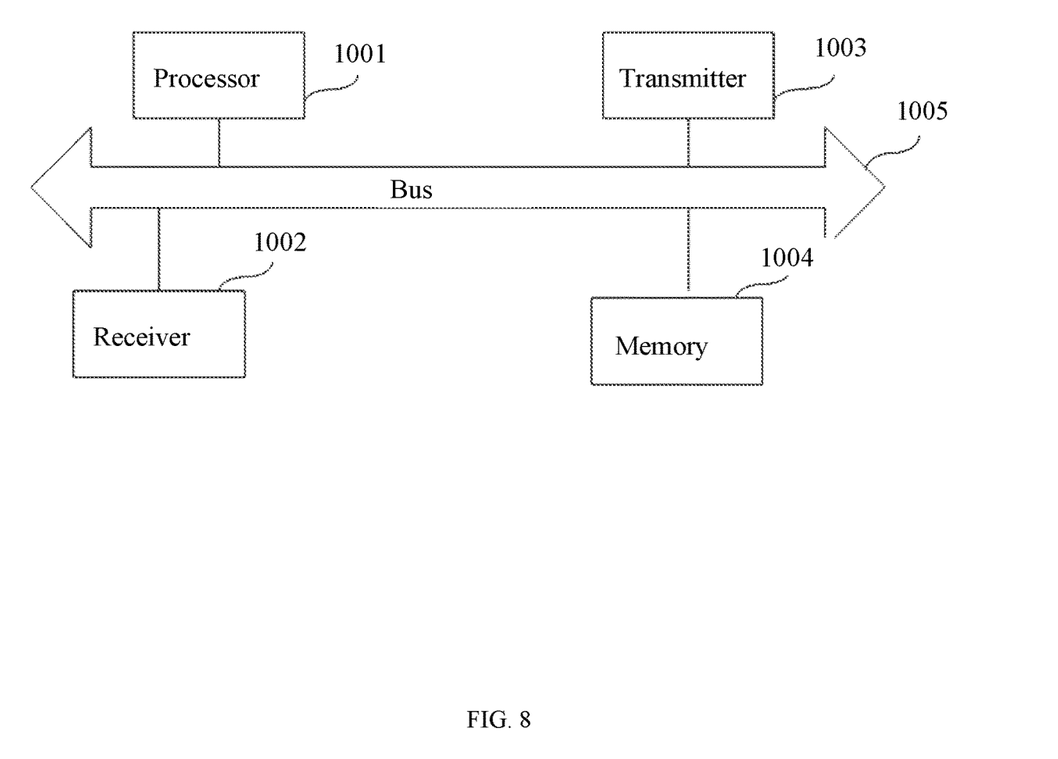
FIG. 8 is a block diagram of a terminal provided by one or more examples of the present disclosure.

FIG. 8 is schematic structural diagram of a terminal provided by an example of the present disclosure, and the terminal includes: a processor 1001, a receiver 1002, a transmitter 1003, a memory 1004, and a bus 1005.

The processor 1001 includes one or more processing cores, and the processor 1001 executes various functional applications and information processing by running software programs and modules.

The receiver 1002 and the transmitter 1003 may be realized as a communication component, which may be a communication chip.

The memory 1004 is connected to the processor 1001 through the bus 1005.

The memory 1004 may be used to store at least one instruction, and the processor 1001 is used to execute the at least one instruction to realize the respective steps in the above method examples.

Furthermore, the memory 1004 may be realized by any type or combination of volatile or non-volatile storage devices including, but not limited to: magnetic or optical disks, electrically erasable programmable read only memory (EEPROM), erasable programmable read only memory (EPROM), static random-access memory (SRAM), read only memory (ROM), magnetic memory, flash memory, programmable read only memory (PROM).

In an example of the present disclosure, there is further provided a non-transitory computer-readable storage medium including instructions, such as a memory including instructions, and the above instructions may be executed by the processor of the terminal to complete the method performed by the terminal side in the above methods for transmitting a feedback sequence. For example, the non-transitory computer-readable storage medium may be a ROM, a random-access memory (RAM), a CD-ROM, a magnetic tape, a floppy disk, an optical data storage device, and the like.

In an example of the present disclosure, there is further provided a non-transitory computer-readable storage medium, when the instructions in the non-transitory computer storage medium are executed by the processor of the terminal, the terminal is able to execute the above methods for transmitting a feedback sequence.

An example of the present disclosure further provides a system (or communication system) for transmitting a feedback sequence, and the system includes: a feedback terminal and a receiving terminal.

The receiving terminal includes an apparatus for transmitting a feedback sequence provided by the example as shown in FIG. 6.

The feedback terminal includes an apparatus for transmitting a feedback sequence provided by the example shown in FIG. 5.

An example of the present disclosure further provides a computer-readable storage medium, the computer-readable storage medium stores at least one instruction, at least one piece of program, one code set or one instruction set, and the at least one instruction, the at least one piece of program, the code set or the instruction set is loaded and executed by the processor to realize the steps executed by the terminal in the methods for transmitting a feedback sequence provided by the above method examples.

It should be understood that reference herein to "a plurality" refers to two or more. "And/or", which describes an association relationship of the associated objects, means that there may be three kinds of relationships, for example, A and/or B, which may mean that A exists alone, A and B exist at the same time, and B exists alone. The character "/" generally indicates that the associated objects are an "or" relationship.

Other examples of the present disclosure will readily occur to those skilled in the art upon consideration of the specification and practice of the invention disclosed herein. This disclosure is intended to cover any variations, uses, or adaptations of this disclosure that follow the general principles of this disclosure and include common general knowledge or commonly-used techniques in the technical field not disclosed by this disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for transmitting a feedback sequence, comprising:
   determining, by a receiving terminal, a physical-resource location adopted by a feedback terminal when the feedback terminal sends the feedback sequence, based on a feedback characteristic of the feedback terminal; and
   receiving, by the receiving terminal, the feedback sequence at the physical-resource location corresponding to the feedback terminal; wherein
   determining, by the receiving terminal based on the feedback characteristic of the feedback terminal, the physical-resource location adopted by the feedback terminal when the feedback terminal sends the feedback sequence comprises:
   determining, according to a number of bytes of the feedback sequence fed back by the feedback terminal, the physical-resource location adopted by the feedback terminal when the feedback terminal sends the feedback sequence, wherein physical-resource locations corresponding to feedback sequences with different numbers of bytes are different, and the physical-resource location determined according to the number of bytes of the feedback sequence fed back by the feedback terminal comprises a time-domain-resource location and a frequency-domain-resource location.

2. The method according to claim 1, wherein determining, by the receiving terminal, the physical-resource location adopted by the feedback terminal when the feedback terminal sends the feedback sequence, based on the feedback characteristic of the feedback terminal comprises:
   according to distance information between the receiving terminal and the feedback terminal, determining the physical-resource location adopted by the feedback terminal when the feedback terminal sends the feedback sequence, wherein the physical-resource locations shared by feedback terminals in different distance ranges when the feedback terminals send the feedback sequences are different.

3. The method according to claim 2, wherein the method further comprises:
   sending first configuration signaling to the feedback terminal according to the distance information, wherein the first configuration signaling comprises an information field for indicating physical-resource information that the feedback terminal sends the feedback sequence.

4. The method according to claim 2, wherein the method further comprises:
   receiving second configuration signaling sent by an access-network device, wherein the second configuration signaling comprises an information field for indicating a corresponding relationship between the distance ranges and the physical-resource locations.

5. The method according to claim 1, wherein the method further comprises:
   sending third configuration signaling to the feedback terminal according to the number of bytes, wherein the third configuration signaling comprises an information field for indicating physical-resource information that the feedback terminal sends the feedback sequence.

6. The method according to claim 1, wherein the method further comprises:
   receiving fourth configuration signaling sent by an access-network device, wherein the fourth configuration signaling comprises an information field for indicating a corresponding relationship between the numbers of bytes of the feedback sequences and the physical-resource locations.

7. The method according to claim 1, wherein the method further comprises:
   sending fifth configuration signaling to the feedback terminal, wherein the fifth configuration signaling comprises an information field for indicating an initial cyclic shift.

8. The method according to claim 1, wherein the method further comprises:
   receiving notification signaling sent by the feedback terminal, wherein the notification signaling is to indicate an initial cyclic shift correspondingly selected by the feedback terminal.

9. The method according to claim 8, wherein the method further comprises:
   sending sixth configuration signaling to the feedback terminal, when the initial cyclic shift conflicts with initial cyclic shifts fed back by other feedback terminals, wherein the sixth configuration signaling comprises an information field for indicating an adjusted initial cyclic shift.

10. A receiving terminal, comprising:
    a processor; and
    a transceiver connected to the processor,
    wherein the processor is configured to:
    determine a physical-resource location adopted by a feedback terminal when the feedback terminal sends the feedback sequence, based on a feedback characteristic of the feedback terminal; and
    receive the feedback sequence at the physical-resource location corresponding to the feedback terminal; wherein
    the processor is specifically configured to:
    determine, according to a number of bytes of the feedback sequence fed back by the feedback terminal, the physical-resource location adopted by the feedback terminal when the feedback terminal sends the feedback sequence, wherein physical-resource locations corresponding to feedback sequences with different numbers of bytes are different, and the physical-resource location determined according to the number of bytes of the feedback sequence fed back by the feedback terminal comprises a time-domain-resource location and a frequency-domain-resource location.

11. The receiving terminal according to claim 10, wherein the processor is further configured to, according to distance information between the receiving terminal and the feedback terminal, determine the physical-resource location adopted by the feedback terminal when the feedback terminal sends the feedback sequence, and the physical-resource locations shared by feedback terminals in different distance ranges when the feedback terminals send the feedback sequences are different.

12. The receiving terminal according to claim 11, wherein the processor is further configured to:
send first configuration signaling to the feedback terminal according to the distance information, wherein the first configuration signaling comprises an information field for indicating physical-resource information that the feedback terminal sends the feedback sequence.

13. The receiving terminal according to claim 11, wherein the processor is further configured to receive second configuration signaling sent by an access-network device, and the second configuration signaling comprises an information field for indicating a corresponding relationship between the distance ranges and the physical-resource locations.

14. The receiving terminal according to claim 10, wherein the processor is further configured to:
send third configuration signaling to the feedback terminal according to the number of bytes, wherein the third configuration signaling comprises an information field for indicating physical-resource information that the feedback terminal sends the feedback sequence.

15. The receiving terminal according to claim 10, wherein the processor is further configured to receive fourth configuration signaling sent by an access-network device, and the fourth configuration signaling comprises an information field for indicating a corresponding relationship between the numbers of bytes of the feedback sequences and the physical-resource locations.

16. The receiving terminal according to claim 10, wherein the processor is further configured to:
send fifth configuration signaling to the feedback terminal, wherein the fifth configuration signaling comprises an information field for indicating an initial cyclic shift.

17. The receiving terminal according to claim 10, wherein the processor is further configured to receive notification signaling sent by the feedback terminal, and the notification signaling is adopted to indicate an initial cyclic shift correspondingly selected by the feedback terminal.

18. A non-transitory computer-readable storage medium, storing at least one instruction, at least one instruction, at least one piece of program, one code set or one instruction set, and the at least one instruction, the at least one piece of program, the code set or the instruction set is loaded and executed by a processor,
wherein the processor is configured to:
determine, by a receiving terminal, a physical-resource location adopted by a feedback terminal when the feedback terminal sends the feedback sequence, based on a feedback characteristic of the feedback terminal; and
receive, by the receiving terminal, the feedback sequence at the physical-resource location corresponding to the feedback terminal; wherein
the processor is specifically configured to:
determine, according to a number of bytes of the feedback sequence fed back by the feedback terminal, the physical-resource location adopted by the feedback terminal when the feedback terminal sends the feedback sequence, wherein physical-resource locations corresponding to feedback sequences with different numbers of bytes are different, and the physical-resource location determined according to the number of bytes of the feedback sequence fed back by the feedback terminal comprises a time-domain-resource location and a frequency-domain-resource location.

* * * * *